United States Patent
Akiyama et al.

(10) Patent No.: US 10,268,902 B2
(45) Date of Patent: Apr. 23, 2019

(54) OUTSIDE RECOGNITION SYSTEM, VEHICLE AND CAMERA DIRTINESS DETECTION METHOD

(71) Applicant: Clarion Co., Ltd., Saitama (JP)

(72) Inventors: Yasuhiro Akiyama, Tokyo (JP); Katsuyuki Nakamura, Tokyo (JP); Kota Irie, Saitama (JP)

(73) Assignee: Clarion Co., Ltd., Saitama (JP)

( * ) Notice: Subject to any disclaimer, the term of this patent is extended or adjusted under 35 U.S.C. 154(b) by 79 days.

(21) Appl. No.: 15/117,777

(22) PCT Filed: Jan. 30, 2015

(86) PCT No.: PCT/JP2015/052778
§ 371 (c)(1),
(2) Date: Aug. 10, 2016

(87) PCT Pub. No.: WO2015/125590
PCT Pub. Date: Aug. 27, 2015

(65) Prior Publication Data
US 2016/0364620 A1 Dec. 15, 2016

(30) Foreign Application Priority Data
Feb. 18, 2014 (JP) .................. 2014-028414

(51) Int. Cl.
| G06K 9/00 | (2006.01) |
| H04N 7/18 | (2006.01) |
| G08G 1/16 | (2006.01) |
| B60R 11/04 | (2006.01) |

(52) U.S. Cl.
CPC .......... *G06K 9/00791* (2013.01); *B60R 11/04* (2013.01); *G06K 9/00798* (2013.01); *G08G 1/166* (2013.01); *H04N 7/188* (2013.01)

(58) Field of Classification Search
CPC ............ G06K 9/00791; G06K 9/00798; B60R 11/04; G08G 1/166; H04N 7/188
See application file for complete search history.

(56) References Cited

U.S. PATENT DOCUMENTS

| 2007/0263902 A1* | 11/2007 | Higuchi ............... G05D 1/0246 382/104 |
| 2014/0028849 A1* | 1/2014 | Tsuchiya ............ G06K 9/00791 348/148 |
| 2015/0323785 A1* | 11/2015 | Fukata .................. G08G 1/166 348/148 |

FOREIGN PATENT DOCUMENTS

| JP | 2005-162168 A | 6/2005 |
| JP | 2007-228448 A | 9/2007 |
| WO | 2012/140976 A1 | 10/2012 |

OTHER PUBLICATIONS

Extended European Search Report received in corresponding European Application No. 15752457.0 dated Aug. 10, 2017.
International Search Report of PCT/JP2015/052778 dated Apr. 7, 2015.

* cited by examiner

*Primary Examiner* — Tung T Vo
*Assistant Examiner* — Joseph W Becker
(74) *Attorney, Agent, or Firm* — Mattingly & Malur, PC

(57) ABSTRACT

An outside recognition system configured to include a camera installed on a vehicle, to analyze an image from the camera, and to recognize surroundings of the vehicle based on an analysis result of the image from the camera comprises a dirtiness detection unit which determines, as at least one reference line, at least one line on a part of at least one object that does not change in the image from the camera even if the vehicle travels, determines an observation line that corresponds to each of the at least one reference line with the image from the camera, calculates an amount by which the observation line is displaced from each of the at least one reference line, and detects whether dirt adheres to the camera based on the amount of displacement.

11 Claims, 10 Drawing Sheets

FIRST METHOD FINISHER

SECOND METHOD

NO RAINDROPS

RAINDROPS

FIRST METHOD FINISHER

SECOND METHOD

OUTSIDE RECOGNITION SYSTEM, VEHICLE AND CAMERA DIRTINESS DETECTION METHOD

CLAIM OF PRIORITY

This application is based on, and claims priority to, Japanese Patent Application No. 2014-28414, filed on Feb. 18, 2014, contents of which are incorporated herein by reference.

BACKGROUND

The present invention relates to an outside recognition system configured to recognize the surroundings of a vehicle based on an image from a camera, and in particular to detect dirtiness adhered to the camera.

Technology to monitor the surroundings of a vehicle with an on-vehicle camera and output a warning to the driver of the vehicle and to automatically control the action of the vehicle, in order to prevent a vehicle from a collision to another vehicle and/or a person before it happens, when danger is detected is advancing.

With a system that includes the on-vehicle camera on the outside surface of the vehicle, dirt is likely to be adhered to the lens of the camera due to bad weather, dirt, dust, or the like. Due to such dirtiness on the lens, there is a possibility that a wrong warning, which causes lower safety, is outputted.

Accordingly, there has been practical implementation of a system that automatically detects dirt on the lens of the camera and sprays air or water, or the like, in order to remove the dirt from the lens of the camera.

For example, JP 2007-228448 A discloses a technology for detecting dirt on the lens of the on-vehicle camera.

JP 2007-228448 A indicates "it captures images of the surroundings of the vehicle by shooting apparatus installed on the vehicle to acquire information on objects within the view of the shooting apparatus such as signs and pedestrians or texture before executing the image recognition processing. Then, the objects and the texture within the view are recognized by the image recognition unit, and based on the recognized object shapes or the texture and, information of the objects and the texture obtained in advance, the distortion of the shape or texture of the recognized object and the degree of image blur are calculated. Based on the calculated distortion and the degree of image blur of the recognized objects and texture, the shooting environment including the presence of water drops or dirtiness, or mist, or lack thereof, on the lens is recognized." (See abstract)

SUMMARY

However, according to the technology disclosed in JP 2007-228448 A observes edge displacement of the bumper in point groups from the camera at the rear end of the vehicle, and calculates the average value of the observed values. Since the edge observation points are arranged at a predetermined interval, dirtiness at points which are not the edge observation points is not taken account in the observed value. Accordingly, dirtiness on the on-vehicle camera is not detected accurately.

The present invention is intended to provide an outside recognition system having an improved accuracy in detecting dirtiness on the on-vehicle camera.

A representative example of the present invention is an outside recognition system configured to include a camera installed on a vehicle, analyze an image from the camera, and recognize surroundings of the vehicle based on an analysis result of the image from the camera comprising: a dirtiness detection unit configured to detect whether dirt adheres to the camera, wherein the dirtiness detection unit determines, as at least one reference line, at least one line on a part of at least one object that does not change in the image from the camera even if the vehicle travels, wherein the dirtiness detection unit determines an observation line that corresponds to each of the at least one reference line with the image from the camera, wherein the dirtiness detection unit calculates an amount by which the observation line is displaced from each of the at least one reference line, and wherein the dirtiness detection unit detects whether dirt adheres to the camera based on the amount of displacement.

Below briefly describes effects obtained by some of the representative inventions disclosed in the present application. The inventions provide an outside recognition system having improved accuracy of the detection of dirtiness on the on-vehicle camera.

The problems to be solved by this invention, the configurations, and the advantageous effects other than those described above according to this invention are made clear based on the following description of the embodiments.

BRIEF DESCRIPTIONS OF DRAWINGS

The present invention can be appreciated by the description which follows in conjunction with the following figures, wherein.

DETAILED DESCRIPTIONS OF THE EMBODIMENTS

Figure 1:
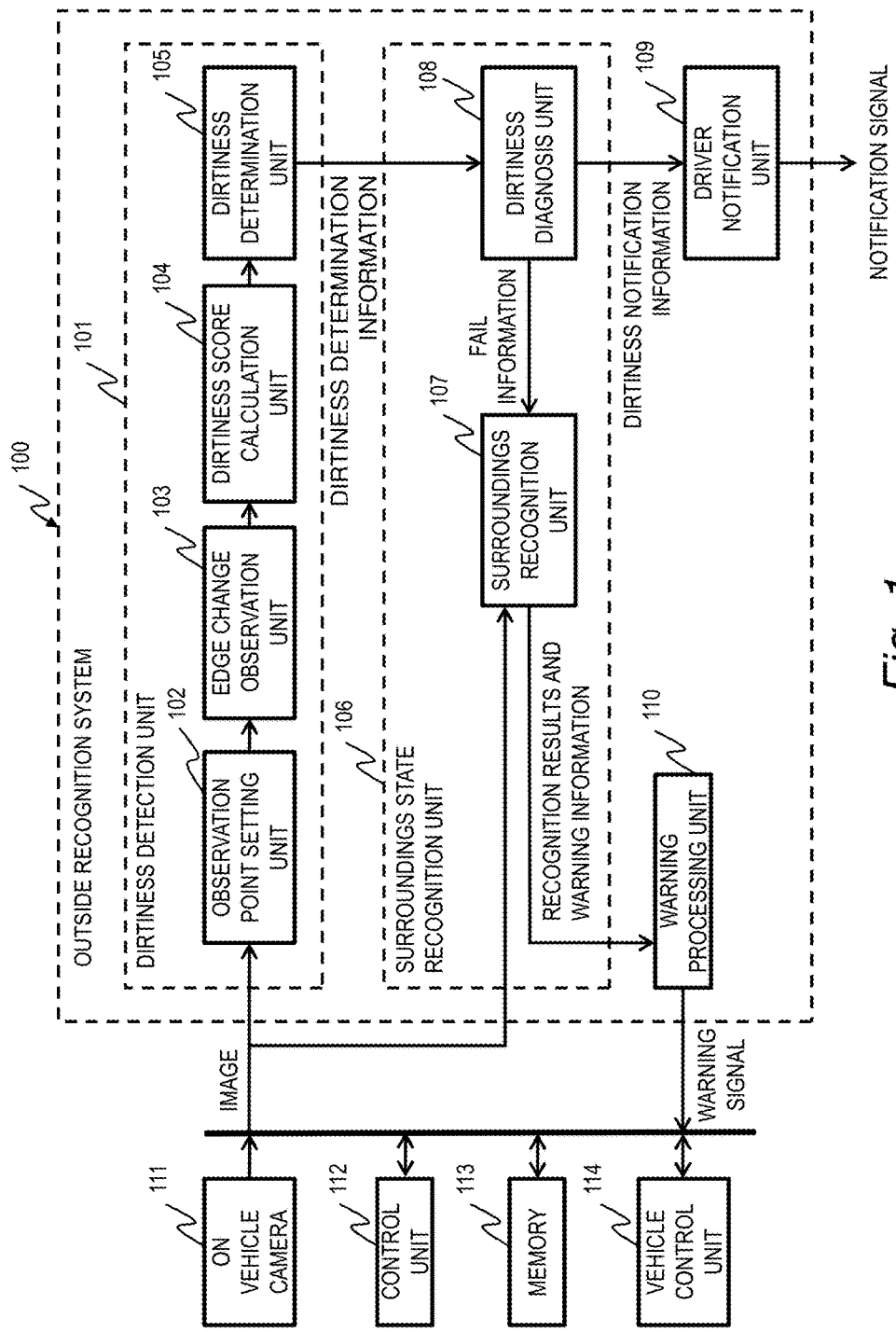
FIG. 1 is an explanatory diagram depicting an outside recognition system according to embodiment 1.

Embodiment 1 will be described with reference to FIG. 1 through FIG. 12. FIG. 1 is an explanatory diagram depicting an outside recognition system 100 according to embodiment 1.

The outside recognition system 100 receives an image from an on-vehicle camera 111, which is installed in a vehicle, executes predetermined image signal processing on the received image, recognizes a state of surroundings of the vehicle, and notifies a vehicle control unit 114 and a driver of the results of the recognition.

The recognition of the state of surroundings of the vehicle includes recognition whether or not there is, in the surrounding space of the vehicle, another vehicle, which includes a motor cycle or a bicycle, or a pedestrian, or an obstacle that interrupts the traveling or parking of the vehicle, or a traffic lane that allows the vehicle to travel the road in a stable manner, by the outside recognition system 100 analyzing the image from the on-vehicle camera 111. The recognition of surroundings additionally includes prediction for a collision of the vehicle and the approaching object and prediction for a collision of the vehicle and the obstacle, by detecting a fast approaching object both near and far from the vehicle such as another vehicle, which includes a motor cycle or a bicycle, or a pedestrian The outside recognition system 100 is connected with the on-vehicle camera 111, a control unit 112, a memory 113, and a vehicle control unit 114 through a signal bus.

The on-vehicle camera 111 may be installed, for example, at a rear end of a vehicle or at a space between a finisher, which is a part of the vehicle body, and a bumper, which is installed below the finisher, to be more specific. The on-vehicle camera 111 takes an image of the surroundings of the vehicle, and the image is temporarily saved at the memory 113. Note that the location where the on-vehicle camera 111 is installed is not limited to the rear end of the vehicle, and may be installed at a front end or on the left or right side of the vehicle, for example.

The control unit 112 controls an input/output of the image stored at the control unit 112 and an input/output of a warning signal between the outside recognition system 100 and the vehicle control unit 114. The memory 113 stores therein the images taken by the on-vehicle camera 111 and programs executed by the control unit 112.

The vehicle control unit 114 controls the operation of the vehicle such as engine control, brake control, or the like.

The outside recognition system 100 includes a dirtiness detection unit 101, a surroundings state recognition unit 106, a warning processing unit 110, and a driver notification unit 109. The outside recognition system 100 includes a processor and a memory which are not illustrated. The memory stores therein programs that correspond to the dirtiness detection unit 101, the surroundings state recognition unit 106, the warning processing unit 110 and the driver notification unit 109. The processor executes the programs in order for the outside recognition system 100 to implement the function of the dirtiness detection unit 101, the surroundings state recognition unit 106, the warning processing unit 110 and the driver notification unit 109.

The dirtiness detection unit 101 analyzes the image taken by the on-vehicle camera 111 so as to determine whether or not dirt adheres to a lens of the on-vehicle camera 111. To be more specific, the dirtiness detection unit 101 calculates, based on the image inputted from the on-vehicle camera 111, a position a predetermined reference line, which remains fixed regardless of the movement of the vehicle, so as to detect whether or not dirt adheres to the lens of the on-vehicle camera 111. This is to focus on the distortion of the lines that, when dirtiness such as raindrop adheres to the lens of the on-vehicle camera 111, may occur on the image from the on-vehicle camera 111 that corresponds to the predetermined reference line which remains unchanged irrespective of the motion of the vehicle.

The dirtiness detection unit 101 includes an observation point setting unit 102, an edge change observation unit 103, a dirtiness score calculation unit 104, and a dirtiness determination unit 105.

The observation point setting unit 102 sets a plurality of observation points on the reference line. Since an object in the image taken by the on-vehicle camera 111 includes the finisher and the bumper, which are parts of the vehicle, positions of the finisher and the bumper do not change in the image inputted from the on-vehicle camera 111 even if the vehicle moves. Accordingly, in the present embodiment an edge line of the finisher will be used as an upper reference line (finisher reference line (first reference line)) while an edge line of the bumper will be used as a lower reference line (bumper reference line (second reference line)).

The edge change observation unit 103 calculates the displacement (edge displacement) of the observation line set by the observation point setting unit 102 in the image from the on-vehicle camera 111, calculates a displacement point that corresponds to each observation point, and calculates the observation line that corresponds to the reference line by interpolation with calculated displacement points. Note that the observation line that corresponds to the finisher reference line is referred to as a finisher observation line, and the observation line that corresponds to the bumper reference line is referred to as a bumper observation line.

The dirtiness score calculation unit 104 calculates the amount by which the observation line is displaced from the reference line. The dirtiness score calculation unit 104 calculates the area of a predetermined region by using a first method or a second method so as to calculate the displaced amount of the observation line. The first method calculates the area of the region of the region between the observation line and the reference line, and the second method calculates the area of the region between the finisher observation line and the bumper observation line.

The dirtiness determination unit 105 compares the displaced amount of the observation line with a threshold so as to determine whether or not dirt adheres to the lens of the on-vehicle camera 111, and outputs the result of the determination to the dirtiness diagnosis unit 108 of the surroundings state recognition unit 106.

The surroundings state recognition unit 106 includes the dirtiness diagnosis unit 108 and surroundings recognition unit 107. The dirtiness diagnosis unit 108 diagnoses as to whether or not dirt adheres to the lens of the on-vehicle camera 111 based on the results of the determination. The dirtiness diagnosis unit 108, when it diagnoses that dirt adheres to the lens of the on-vehicle camera 111, outputs FAIL information, which instructs the surroundings recognition unit 107 to suspend the recognition processing of the state surrounding the vehicle since it is difficult for the surroundings recognition unit 107 to accurately execute image recognition processing and to be likely to misrecognize image, to the surroundings recognition unit 107 and outputs, to the driver notification unit 109, dirtiness notification information for notifying a driver of the vehicle of suspending the recognition processing by the surroundings recognition unit 107 due to the dirt on the lens.

The surroundings recognition unit 107 analyzes the image of the on-vehicle camera 111, recognizes the state of the surroundings of the vehicle, and outputs the result of the recognition and warning information to the warning processing unit 110. Note that the surroundings recognition unit 107 suspends the recognition processing of the state of the surroundings of the vehicle when the FAIL information is inputted from the dirtiness diagnosis unit 108.

The warning processing unit 110 transmits the recognition results and the warning signal inputted from the surroundings recognition unit 107 as a warning signal to the vehicle control unit 114. When receiving the warning signal, the vehicle control unit 114 controls the vehicle based on the received warning information and outputs a warning to the driver.

When the driver notification unit 109 receives the dirtiness notification information from the dirtiness diagnosis unit 108, the driver notification unit 109 informs the driver that dirt adheres to the lens of the on-vehicle camera 111 and that the recognition processing by the surroundings recognition unit 107 is suspended. As for the mode of the notification, the message to the driver may be displayed on a display that is installed outside the outside recognition system 100, or the message may be voice-outputted by a speaker that is installed outside the outside recognition system 100.

Note that the dirtiness detection unit 101 is operable to detect not only raindrops but also snow, dirt, white cloudiness, and the like on the lens of the on-vehicle camera 111.

Figure 2:
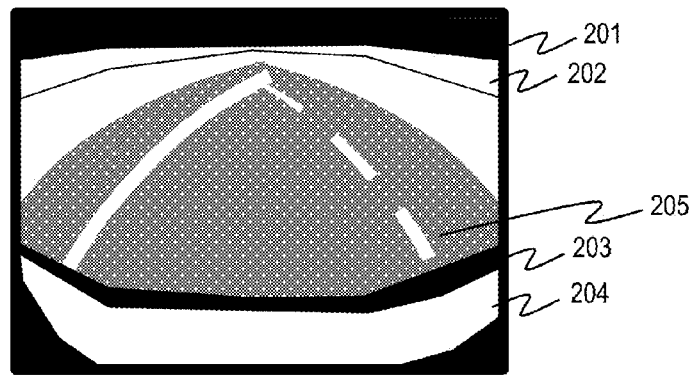
FIG. 2 is an explanatory diagram depicting an image of the on-vehicle camera according to embodiment 1.

FIG. 2 is an explanatory diagram depicting an image of the on-vehicle camera 111 according to embodiment 1.

As described with FIG. 1, the on-vehicle camera 111 is installed at a space between the finisher which is a part of the vehicle at the rear end and a bumper which is installed below the finisher.

The object of the image of the on-vehicle camera 111 includes a douser 201, a finisher 202, a bumper 203, a number plate 204, and a road 205.

The douser 201 includes an image of a douser, which is installed on the upper part of the on-vehicle camera 111 so as to prevent unnecessary sun light or the like from entering the image taken by the on-vehicle camera 111. The finisher 202 includes an image of the finisher installed above the on-vehicle camera 111. The bumper 203 includes an image of the bumper installed below the on-vehicle camera 111. The number plate 204 includes an image of the number plate of the vehicle. The road 205 includes an image of the road behind the vehicle which includes other vehicles, the rear view of the vehicle, or the like.

The road 205 in the image of the on-vehicle camera 111 changes with the lapse of time as the vehicle travels. On the other hand, since the relative distance between any the douser, the finisher, the bumper, and the number plate with the on-vehicle camera 111 does not change despite the movement of the vehicle, the douser 201, the finisher 202, the bumper 203 and the number plate 204 in the image of the on-vehicle camera 111 do not change despite the movement of the vehicle and are constantly displayed as stationary objects.

Note that while the present embodiment explains with an example where the finisher 202 and the bumper 203 among the stationary objects are regarded as the reference lines, the reference lines are not limited to the finisher 202 and the bumper 203; the douser 201 or the number plate 204 may be used as the reference lines. Also, when the first method is used to calculate the amount by which the observation line is displaced from the reference line, the reference line may be set with at least one of the douser 201, the finisher 202, the bumper 203, and the number plate 204; and when the second method is used to calculate the amount by which the observation line is displaced from the reference line, the reference line may be set with at least two of the douser 201, the finisher 202, the bumper 203 and the number plate 204. When the image of the on-vehicle camera 111 always includes a stationary object, this stationary object may be used as the reference line.

Figure 3A:
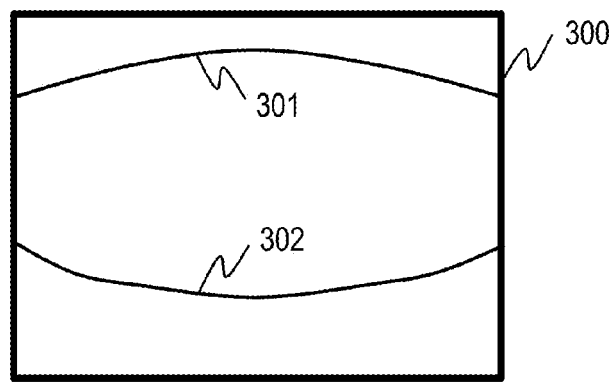
FIG. 3A is an explanatory diagram depicting a finisher reference line and a bumper reference line according to embodiment 1.

FIG. 3A is an explanatory diagram depicting the finisher reference line and the bumper reference line.

The observation point setting unit 102 sets, as a finisher reference line 301, the edge line of the finisher that is included in the image of the on-vehicle camera 111 whose lens of the on-vehicle camera 111 adheres to dirt. In the same manner, the observation point setting unit 102 sets, as a bumper reference line 302, the edge line of the bumper that is included in the image of the on-vehicle camera 111 whose the lens is adhered to no dirt.

To be more specific, the observation point setting unit 102 sets the finisher reference line and the bumper reference line based on design information on the shape of the vehicle, information on the installation position of the on-vehicle camera 111, and the parameter information on the on-vehicle camera 111. The information on the installation position of the on-vehicle camera 111 may include the height and the depth of the position where the on-vehicle camera 111 is installed, for example. The parameter information on the on-vehicle camera 111 may include internal parameter information and external parameter information, where the internal parameter information includes the focal length of the on-vehicle camera 111, pixel center position (central position of image sensor element) and the lens distortion coefficient, or the like, and the external parameter information includes the angle of installation. The angle of installation of the on-vehicle camera 111 may be expressed in angular values of three axes: pitch (X axis), yaw (Y axis) and roll (Z axis). The pitch includes the axial rotation in the vertical direction; yaw includes the axial rotation in the lateral direction; and the roll includes the axial rotation in the direction the camera shoots an image.

Figure 3B:
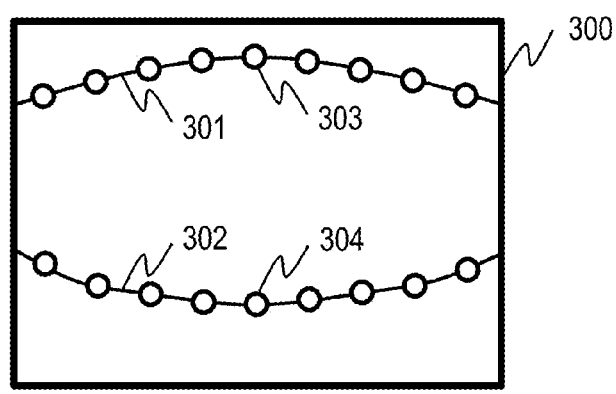
FIG. 3B is an explanatory diagram depicting a plurality of observation points arranged on each reference line according to embodiment 1.

FIG. 3B is an explanatory diagram depicting a plurality of observation points arranged on each reference line.

The observation point setting unit 102 sets a plurality of observation points (finisher observation points) 303 arranged at a predetermined interval on the finisher reference line 301, and a plurality of observation points (bumper observation point 304) arranged at a predetermined interval on the bumper reference line 302.

Note that while the number of observation points arranged on each reference line may be freely-selected, it is preferable that as many number of observation points as possible are arranged on the reference line in order to improve the accuracy of the observation line calculated from the displacement corresponding to the observation points.

Figure 4A:
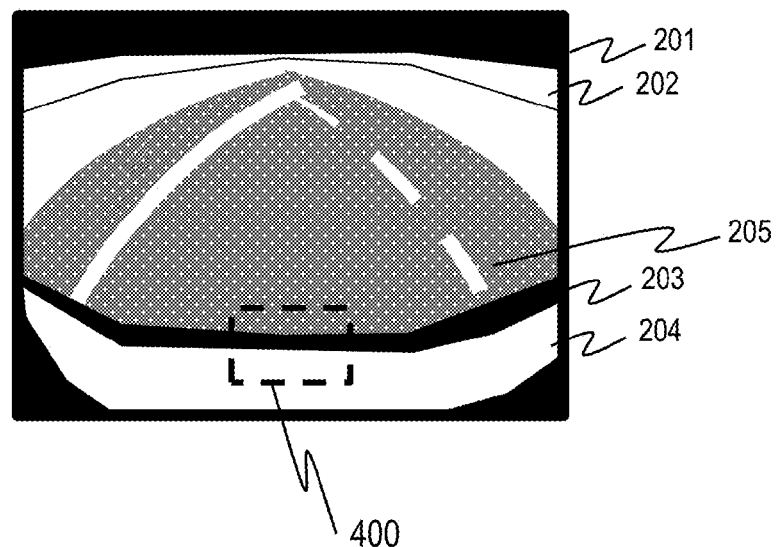
FIG. 4A is an example of an image of an on-vehicle camera according to embodiment 1.
Figure 4B:
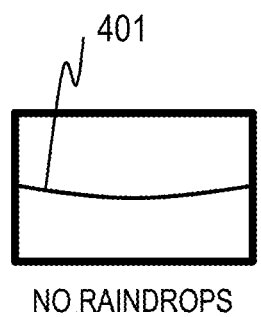
FIG. 4B is an example of a bumper observation line before a raindrop adheres to a lens of the on-vehicle camera according to embodiment 1.
Figure 4C:
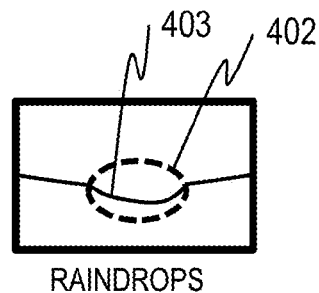
FIG. 4C is an example of a bumper observation line when a raindrop adheres to the lens of the on-vehicle camera according to embodiment 1.

FIGS. 4A to 4C are explanatory diagrams depicting the changes of the bumper observation line as raindrops adhere to the lens of the on-vehicle camera 111 according to embodiment 1.

The finisher observation line and the bumper observation line tend to change significantly when dirt such as raindrops adheres to the lens of the on-vehicle camera 111 compared to when the lens has no such dirtiness adhered thereto.

FIGS. 4B and 4C depict an example which focuses on an area 400, which is a portion of the bumper 203 in the image of the on-vehicle camera 111 in FIG. 4A. FIG. 4B depicts a bumper observation line 401 before a raindrop adheres to the lens of the on-vehicle camera 111. FIG. 4C depicts a bumper observation line 403 when a raindrop adheres to the lens of the on-vehicle camera 111. The bumper observation line 403 at a spot 402 where the raindrop adheres is significantly deformed due to refraction of light going through the raindrop (or water film). Note that a significant deformation of the observation line with respect to the reference line such as the bumper observation line 403, or the like, occurs not only with raindrops but also with snow, dirt white cloudiness, or the like.

Figure 5:
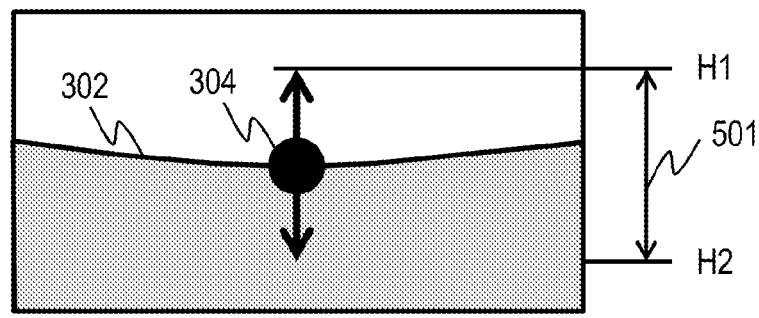
FIG. 5 is an explanatory diagram depicting a calculation of a displacement point of a bumper observation point on a bumper reference line according to embodiment 1.

FIG. 5 is an explanatory diagram depicting a calculation of a displacement point of the bumper observation point 304 on the bumper reference line 302 according to embodiment 1.

The edge change observation unit 103 acquires a luminance value (for example, 0 through 255) of a pixel arranged within a predetermined range (pixel acquisition range) 501 (H1 through H3) from the bumper observation point 304 set on the bumper reference line 302 in a direction that is orthogonal to the bumper reference line 302. Then, the edge change observation unit 103 calculates, as the displacement point, the location of the pixel whose gradient of the luminance value to an adjacent pixel is the largest. Note that the pixel acquisition range 501 may be set randomly within the scope in which the gradient of the luminance value is calculable. Each observation point may include a unique pixel acquisition range 501.

Although the bumper observation point 304 is set at the center of the pixel acquisition range 501 in FIG. 5 so as to allow the displacement point to move in either direction vertically from the bumper observation point 304, the center of the pixel acquisition range 501 may be shifted either upward or downward of the bumper observation point 304.

FIG. 5 depicts the bumper reference line 302 which extends from left to right, and the pixel acquisition range 501 set in a direction which is orthogonal to the bumper reference line 302 (vertical direction). However, when the reference line extends in the vertical direction, the pixel acquisition range 501 may be set in a horizontal direction, for example.

Figure 6:
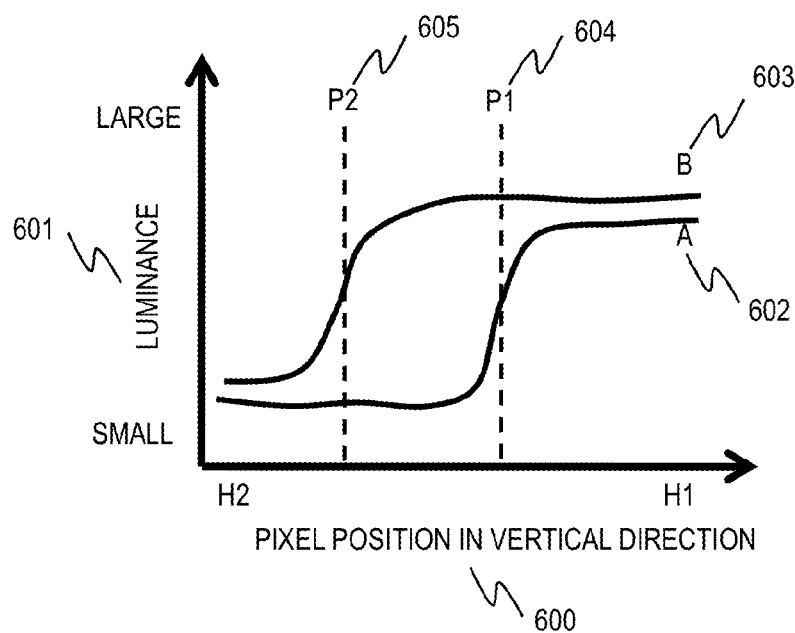
FIG. 6 is an explanatory diagram depicting a change of a luminance value of a pixel of a pixel acquisition range of a bumper observation point according to embodiment 1.

FIG. 6 is an explanatory diagram depicting the change of the luminance value of the pixel of the pixel acquisition range 501 of the bumper observation point 304 according to embodiment 1.

In FIG. 6, the horizontal axis 600 indicates the pixel position of the pixels in the pixel acquisition range 501, and the vertical axis 601 indicates the luminance value of each pixel.

For example, the change in the luminance value in a case, as shown in FIG. 5, where the portion below the bumper reference line 302 is darker than the portion above the bumper reference line 302 and no dirt adheres to the lens of the on-vehicle camera 111 would be as shown with a curved line A 602. That is, the curved line A 602 shows that when the pixel position includes a greater luminance value for the pixel in the H1 direction and the pixel position is more toward H2 than H1, the luminance value of the pixel becomes smaller. Note that P1 indicates a pixel position (maximum gradient position) where the gradient of the luminance value of the curved line A 602 is the largest, and also that the pixel of the P1 corresponds to the displacement point corresponding to the bumper observation point 304 when no dirt adheres to the lens of the on-vehicle camera 111.

Meanwhile, when dirt adheres to the lens of the on-vehicle camera 111, since the distortion of the image occurs due to refraction of the light caused by the dirt, the shape of the edge line will change. Accordingly, when dirt adheres to the lens of the on-vehicle camera 111, since the luminance value when no dirt in adheres to the lens of the on-vehicle camera 111 is different from the luminance value whose lens adheres to dirt, the curved line will be as shown with B 603.

The maximum gradient position of the curved line B 603 changes from P1 to P2. It is assumed that this change of the maximum gradient position from P1 to P2 occurs due to the dirt such as raindrops or the like adheres to the lens of the on-vehicle camera 111.

Figure 7:
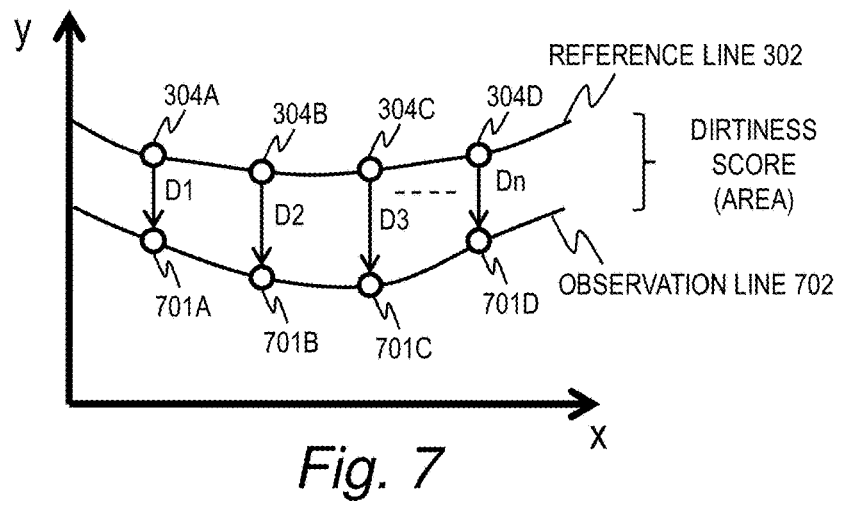
FIG. 7 is an explanatory diagram depicting calculation processing of an observation line according to embodiment 1.

FIG. 7 is an explanatory diagram depicting the calculation processing of the observation line according to embodiment 1.

In FIG. 7, observation points 304A through 304D are arranged on the bumper reference line 302, and the edge change observation unit 103 calculates displacement points 701A through 701D that correspond to the observation points 304A through 304D by the method described with reference to FIG. 6. Then, the edge change observation unit 103 generates a bumper observation line 702 through the coordinates of the calculated displacement points 701A through 701D.

The dirtiness score calculation unit 104 calculates, as a score, the amount of displacement of the bumper observation line 702 from the bumper reference line 302. The displacement of the bumper observation line 702 from the bumper reference line 302 is calculated, for example, by the area of the region between the bumper observation line 702 and the bumper reference line 302.

When no dirt (such as raindrops, etc.) adheres to the lens of the on-vehicle camera 111, since the bumper observation line 702 is not displaced from the bumper reference line 302, the area of the region between the bumper observation line 702 and the bumper reference line 302 is 0.

When dirt adheres to the lens of the on-vehicle camera 111, since the amount by which the bumper observation line 702 is displaced from the bumper reference line 302 becomes greater, the area of the region between the bumper observation line 702 and the bumper reference line 302 becomes greater.

Here, the calculation method for the bumper observation line 702 is described below. Note that the finisher observation line of the finisher reference line 301 which is not shown in the diagrams may be calculated by the same method.

Note that the amount of displacement of each observation point 304A through 304D to each displacement point 701A through 701D is denoted by displacement amount D1 through D4. The edge change observation unit 103 interpolates the area between the displacement points by using the least squares method with these displacement amounts D1 through D4, and calculates the observation line 702 as a quadratic function curve.

The least squares method includes a method for calculating the coefficient of the quadratic function curve so that the squares of the difference between the estimated value (corresponding to the reference line) and the measured value (corresponding to the observation line) is set to be minimal. To be more specific, the quadratic function curve may be calculated by formula 1.

$$f(x) = W_2 X^2 + W_1 X + W_0 \quad \text{(formula 1)}$$

W2, W1 and W0 in formula 1 include the coefficient of the quadratic function, and X is an X coordinate.

The least squares method calculates first the total value T which includes the square value of all of the displacement amounts, D1 through D4, by using formula 2.

$$T = \sum_{x=1}^{n} (Y - f(x))^2 \quad \text{(formula 2)}$$

T in formula 2 includes the square value the displacement amounts D1 through D4, while x is an X coordinate for each observation point 304A through 304D, f(x) is a Y coordinate for each displacement point 701A through 701D, and Y is a Y coordinate for each observation point 304A through 304D of each x.

Substituting the quadratic function formula 1 in formula 2, formula 3 is obtained. T in formula 3 can be considered the function of the coefficients W2, W1 and W3. Therefore, when an equation in which T of formula 3 differentiated by W2, W1 and W3 results in 0, minimum T is obtained.

$$T = \sum_{x=1}^{n} (Y - W_2 X^2 - W_1 X - W_0)^2 \quad \text{(formula 3)}$$

Formula 4 is a matrix equation which fulfills a condition where T is the minimum.

$$\begin{pmatrix} \Sigma X^0 & \Sigma X^1 & \Sigma X^2 \\ \Sigma X^1 & \Sigma X^2 & \Sigma X^3 \\ \Sigma X^2 & \Sigma X^3 & \Sigma X^4 \end{pmatrix} \begin{pmatrix} W_0 \\ W_1 \\ W_2 \end{pmatrix} = \begin{pmatrix} \Sigma X^0 Y \\ \Sigma X^1 Y \\ \Sigma X^2 Y \end{pmatrix} \quad \text{(formula 4)}$$

By solving formula 4 to calculate the coefficients W2, W1 and W0, the quadratic function curve based on each displacement point 701A through 701D is obtained.

By the above, the quadratic function curve that connects each observation point 304A through 304D with each displacement point 701A through 701D with the least squares method is obtained. Note that the method to calculate the observation line from displacement points is not limited to the least squares method, and may include another method.

Next, processing to calculate a score by the dirtiness score calculation unit 104 is described below with reference to FIG. 8.

A first method and a second method for calculating a score by the dirtiness score calculation unit 104 are described below. However the dirtiness score calculation unit 104 may calculate a score by using at least one of the first method and second method.

Figure 8A:
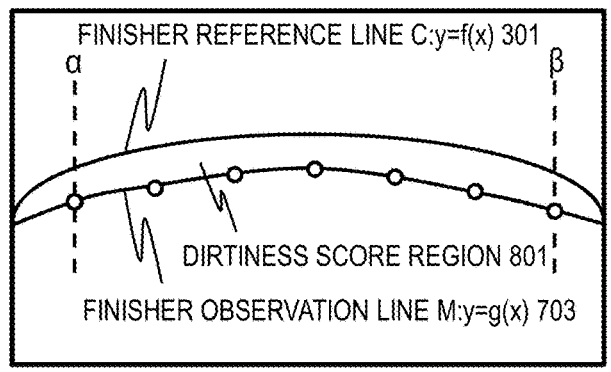
FIG. 8A is an explanatory diagram depicting processing to calculate a score by a dirtiness score calculation unit using a first method according to embodiment 1.

FIG. 8A is an explanatory diagram depicting processing to calculate the score by the dirtiness score calculation unit 104 using the first method.

The first method calculates the score of the displacement of the observation line from the reference line by calculating the area of the region between the observation line and the reference line. In FIG. 8A, the area of the region between a finisher observation line 703 and the finisher reference line (dirtiness score region 801) is calculated as the score, for example. Note that it is possible to calculate the area of the region between the bumper observation line 702 and the bumper reference line 302 using the same method.

When the equation of the quadratic function of the finisher reference line 301 is y=f(x) and the equation of the quadratic function of the finisher observation line 703 is y=g(x), the area S of the dirtiness score region 801 from α to β can be calculated by using formula 5.

$$S = \int_{\alpha}^{\beta} (f(x) - g(x)) dx \quad \text{(formula 5)}$$

Figure 8B:
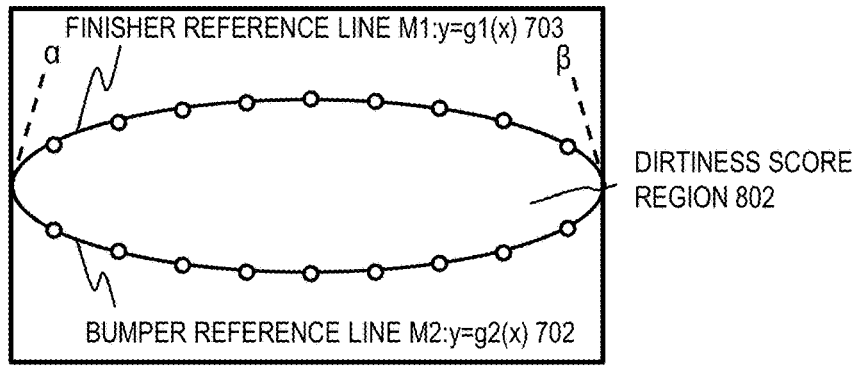
FIG. 8B is an explanatory diagram depicting processing to calculate a score by the dirtiness score calculation unit using a second method according to embodiment 1.

FIG. 8B is an explanatory diagram depicting processing to calculate a score by the dirtiness score calculation unit 104 using the second method.

The second method calculates the score of the displacement of the observation line from the reference line by calculating the area of the region between two observation lines. To be more specific, the area of the region between the finisher observation line 703 and the bumper observation line 702 (dirtiness score region 802) is calculated as the score.

In FIG. 8B, as an example, the area of the region of the dirtiness score region 802 from α to β is calculated. Note that α and β include the points of intersections between the finisher observation line 703 and the bumper observation line 702.

When the equation of the quadratic function of the finisher observation line 703 is y=ax^2+bx+c and the equation of the quadratic function of the bumper observation line 702 is y=dx^2+ex+f, the area S of the dirtiness score region 802 from α to β can be calculated by using formula 6.

$$S = \frac{|a-d|}{6}(\beta - \alpha)^3 \quad \text{(formula 6)}$$

Note that since the area of the region of the dirtiness score region 802 according to the second method is greater than the area of the region of the dirtiness score region 801 according to the first method, a margin for a threshold for determining whether dirt adheres to the lens of the on-vehicle camera 111 becomes great, which makes it easier for the dirtiness determination unit 105 to compare the area and the threshold. This increases the accuracy of the determination as to whether or not dirt adheres to the lens of the on-vehicle camera 111.

FIG. 9 is an explanatory diagram depicting displacement point correction processing by the edge change observation unit 103 according to embodiment 1.

The displacement point correction processing is executed when the dirtiness score calculation unit 104 calculates scores by using the second method, after the edge change observation unit 103 calculates the displacement point.

Figure 9A:
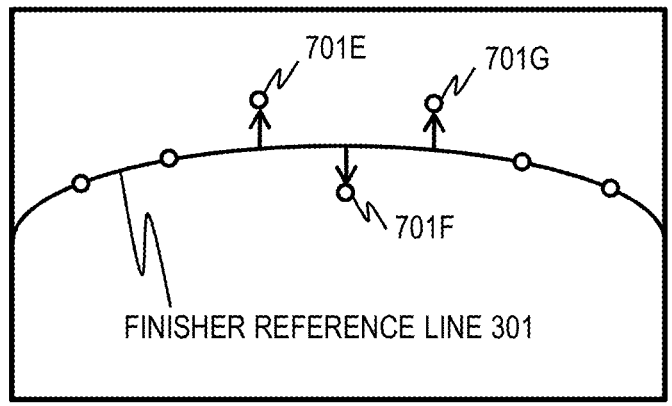
FIG. 9A is an explanatory diagram depicting displacement point correction processing by an edge change observation unit according to embodiment 1.

In FIG. 9A displacement points 701E and 701G are calculated above the finisher reference line 301 and a displacement point 701F is calculated below the finisher reference line 301. When the area of the region between two observation lines is calculated in a situation such as this where the multiple displacement points corresponding to the observation line of the reference line have different directions of displacement, the area may be offset by the displacement of different directions of displacement whereby it would be difficult to accurately calculate the displacement of the observation line from the reference line. For example, when one displacement point out of two displacement points on the reference line is displaced upward, and the other displacement point is displaced downward, the area of the region becomes 0 which would be interpreted that the observation line was not displaced from the reference line.

In order to prevent this, the direction of displacement of a displacement point with respect to the reference line is corrected to a direction so that either the area would be small or a direction so that the area would be great.

Figure 9B:
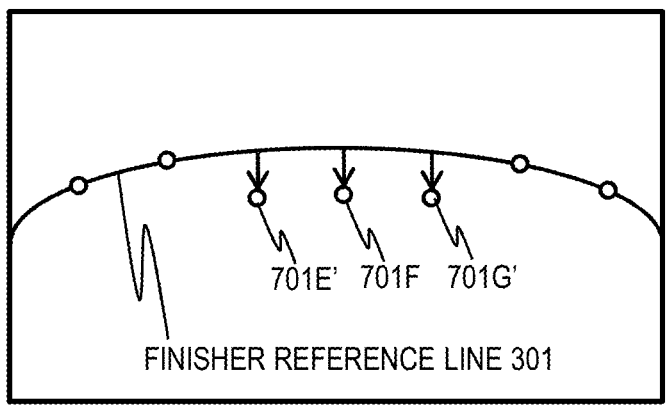
FIG. 9B is an explanatory diagram depicting displacement point correction processing by the edge change observation unit according to embodiment 1.

For example, in FIG. 9B, the displacement point 701E is corrected to a displacement point 701E', which is displaced in a downward direction as much as the displacement point 701E is displaced. Further, the displacement point 701G is corrected to a displacement point 701G', which is displaced in a downward direction as much as the displacement point 701G is displaced. In this case, when the displacement point is calculated to be below the bumper reference line 302, this displacement point is displaced upward as much as it is displaced. Accordingly, in FIGS. 9A and 9B, the displacement points are corrected and displaced in a such direction that the area of the region between the finisher observation line 703 and the bumper observation line 702 becomes smaller (the displacement point above the finisher reference line 301 is corrected to be displaced in a direction downward the finisher reference line 301, and the displacement point below the bumper reference line 302 is corrected to be displaced in a direction upward of the bumper reference line 302) in order to prevent the offset caused by the displacement points displaced in directions different from one another and enable the displacement of the observation line from the reference line to be calculated accurately.

With FIGS. 9A and 9B, a correction method to displace the displacement points in a such direction that the area of the region between the finisher observation line 703 and the bumper observation line 702 becomes smaller is explained above, the correction may be made in a such direction that the area of the region between the finisher observation line 703 and the bumper observation line 702 becomes greater as well. In such case, the displacement point below the finisher reference line 301 is corrected to be displaced in a direction upward the finisher reference line 301, and the displacement point above the bumper reference line 302 is corrected to be displaced in a direction downward of the bumper reference line 302.

Figure 10A:
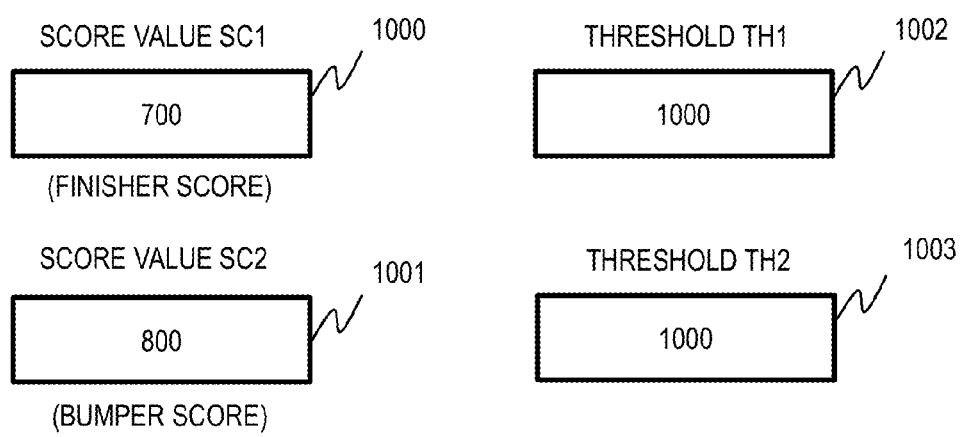
FIG. 10A is an explanatory diagram depicting a relation between a score obtained by the first method and a threshold.
Figure 10B:
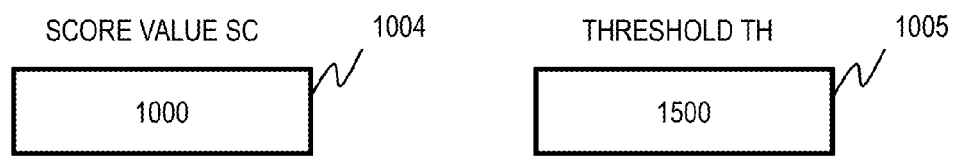
FIG. 10B is an explanatory diagram depicting a relation between a score obtained by the second method and a threshold.

FIGS. 10A and 10B are explanatory diagrams depicting the relation between the score calculated by the dirtiness score calculation unit 104 and the threshold according to embodiment 1.

The dirtiness determination unit 105 determines whether or not dirt adheres to the lens of the on-vehicle camera 111 by comparing the score calculated by the dirtiness score calculation unit 104 and the threshold.

FIG. 10A is an explanatory diagram depicting the relation between the score obtained by the first method and a threshold.

According to the calculation of scores using the first method, at least one of the area of the region between the finisher observation line 703 and the finisher reference line 301 (finisher score value SC1 (1000)) and the area of the region between the bumper observation line 702 and the bumper reference line 302 (bumper score value SC2 (1001)) needs to be calculated. An example where the finisher score value SC1 (1000) and the bumper score value SC2 (1001) are both calculated is described above.

A threshold TH1 (1002) is set with respect to the finisher score value SC1 (1000), and a threshold TH2 (1003) is set with respect to the bumper score value SC2 (1001).

The threshold TH1 (1002) and the threshold TH2 (1003) are initially set to include a predetermined value when the vehicle is started and the outside recognition system 100 is activated.

Note that although the threshold TH1 (1002) and the threshold TH2 (1003) are set at the same value with one another in FIG. 10A, they may have a different value from one another.

Also, even if the finisher score value SC1 (1000) and the bumper score value SC2 (1002) are both calculated, when comparing the sum of the finisher score value SC1 (1000) and the bumper score value SC2 (1002) with a threshold, only one threshold needs to be set.

Also, when only one of the finisher score value SC1 (1000) and the bumper score value SC2 (1002) is calculated, only one threshold that corresponds to the calculated score value needs to be set.

FIG. 10B is an explanatory diagram depicting the relation between the score obtained by the second method and a threshold.

According to the calculation of scores by the second method only one area of the region between the finisher observation line 703 and the finisher reference line 301 is calculated, one score value SC (1004) is calculated and a threshold TH (1005) that corresponds to the score value (1004) is set.

The threshold TH (1005) is initially set to include a predetermined value when the vehicle is started and the outside recognition system 100 is activated.

Figure 11A:
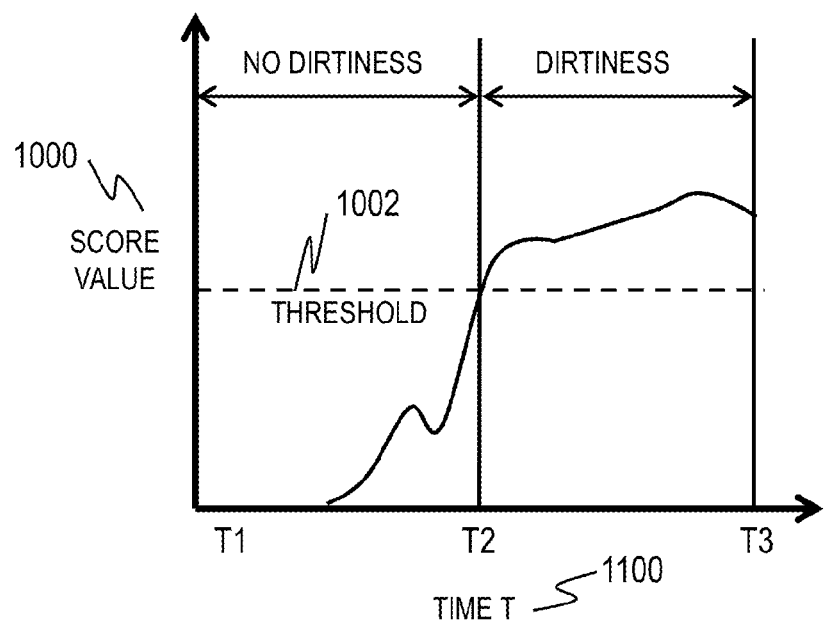
FIG. 11A is an explanatory diagram depicting a result of determination of dirtiness based on a finisher score value obtained by using the first method.
Figure 11B:
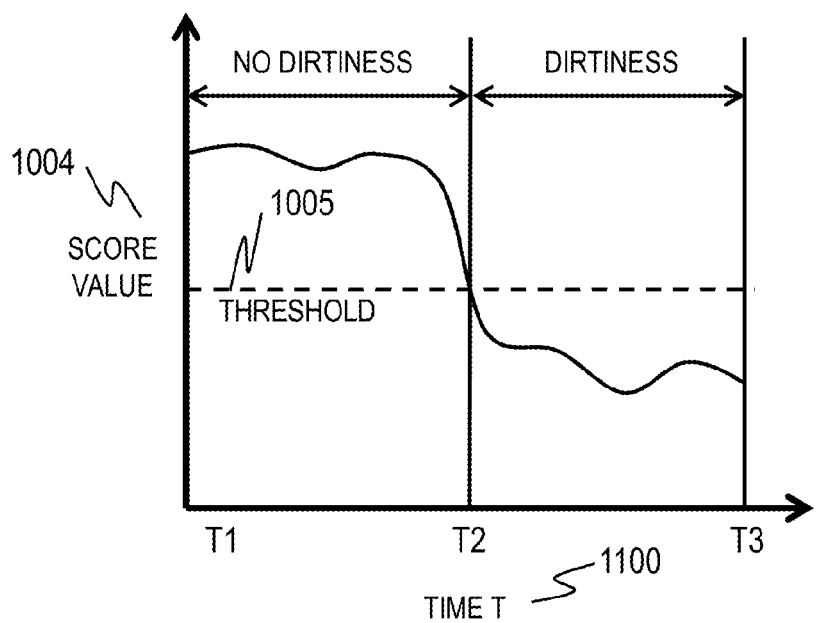
FIG. 11B is an explanatory diagram depicting a result of determination of dirtiness based on a score value obtained by using the second method.

FIGS. 11A and 11B are explanatory diagrams depicting results of determination by the dirtiness determination unit 105.

FIG. 11A is an explanatory diagram depicting a result of determination of dirtiness based on the finisher score value SC1 (1000) obtained by using the first method.

With the first method, as dirt adhesion to the lens of the on-vehicle camera 111 gets worse, the displacement of the observation line from the reference line becomes greater and the area of the region between the observation line and the reference line increases. Accordingly, the dirtiness determination unit 105 determines whether or not the score value calculated by the first method is equal to or greater than the threshold, and determines, when the score value is equal to or greater than the threshold, that dirt adheres to the lens of the on-vehicle camera 111.

FIG. 11A depicts a graph indicating the finisher score value SC1 (1000) on the vertical axis and time T1100 on the horizontal axis. The finisher score value SC1 (1000) increases as time proceeds, and exceeds the threshold TH1 (1002) later than time T2. Accordingly, the result of the determination by the dirtiness determination unit 105 indicates that no dirt adheres to the lens from time T1 until time T2 and that dirt adheres to the lens from time T2 until time T3.

Note that the method described with reference to FIG. 11A may be used for determining the bumper score value SC2 (1002).

FIG. 11B is an explanatory diagram depicting a result of determination of dirtiness based on the score value SC (1004) obtained by using the second method.

Here, an example where the correction is made to displacement points so that the area of the region is smaller as explained with reference to FIG. 9A and FIG. 9B is explained below. When correcting to displacement points in a such direction that the area of the region is smaller, the area of the region between the finisher observation line 703 and the bumper observation line 702 is smaller as the dirt adhesion to the lens of the on-vehicle camera 111 gets worse and the finisher observation line 703 displaces downward while the bumper observation line 702 displaces upward.

Accordingly, the dirtiness determination unit 105 determines whether or not the score value calculated by the second method is equal to or less than the threshold, and determines that dirt adheres to the lens of the on-vehicle camera 111 when the score value is equal to or less than the threshold.

FIG. 11B depicts a graph indicating the score value SC (1004) on the vertical axis and time T1100 on the horizontal axis. The score value SC (1004) decreases as time proceeds, and goes below the threshold TH2 (1005) later time T2. Accordingly, the result of the determination by the dirtiness determination unit 105 includes that no dirt adheres to the lens from time T1 until time T2 and dirt adheres to the lens from time T2 and time T3.

When correcting to displacement points in a such direction that the area of the region is greater, the area of the region between the finisher observation line 703 and the bumper observation line 702 is greater as the dirt adhesion to the lens of the on-vehicle camera 111 gets worse and the finisher observation line 703 displaces upward while the bumper observation line 702 displaces downward. In such case, the dirtiness determination unit 105 determines whether or not the score value calculated by the second method is equal to or greater than the threshold, and determines, when the score value is equal to or greater than the threshold, that dirt adheres to the lens of the on-vehicle camera 111.

Figure 12:
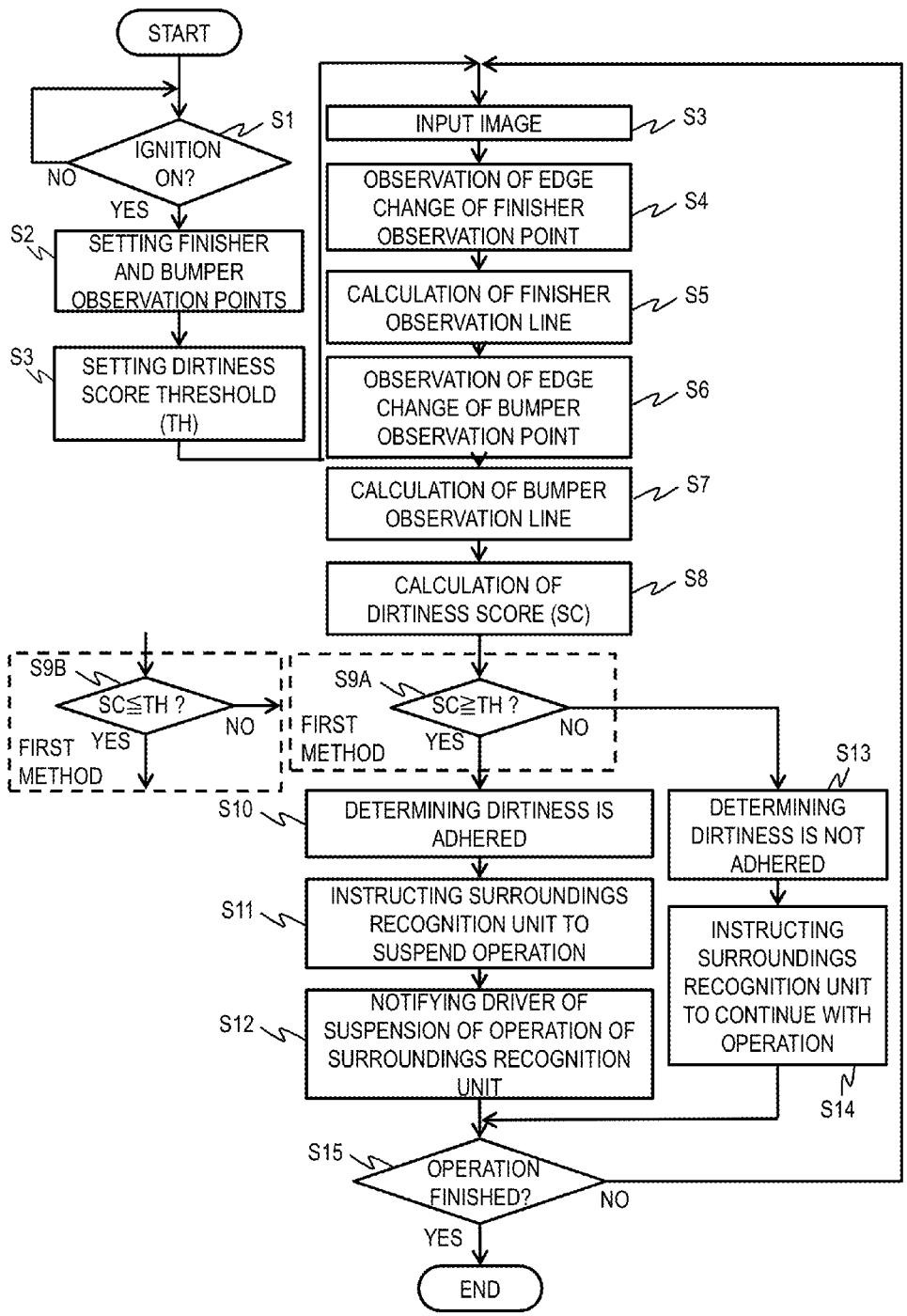
FIG. 12 is a flowchart of processing executed by the outside recognition system according to embodiment 1.

FIG. 12 is a flowchart of processing executed by the outside recognition system 100 according to embodiment 1.

First, the outside recognition system 100 determines whether the ignition of the vehicle is ON (S1).

When it is determined in the processing of S1 that the ignition is not ON, the outside recognition system 100 repeatedly executes the processing of S1 until it is determined that the ignition is ON.

On the other hand, when it is determined in S1 that the ignition is ON, the observation point setting unit 102 sets the finisher observation point 303 and the bumper observation point 304 (S2). In the processing of S2, the observation point setting unit 102 may set the finisher reference line and the bumper reference line based on design information on the shape of the vehicle, information on the installation position of the on-vehicle camera 111, and the parameter information on the on-vehicle camera 111.

Next, the observation point setting unit 102 sets a threshold which is used by the dirtiness determination unit 105 (S3). Note that the observation point setting unit 102 may acquire the current weather information by using a predetermined method and set the threshold based on the acquired weather information. The observation point setting unit 102 may set the threshold such that it is less likely to be determined that dirt adheres to the lens when the weather information indicates rain, snow, or the like, and more likely to be determined that dirt adheres to the lens when the weather information indicates sunny sky, for example. As for the threshold corresponding to the score value obtained by the first method and the score value obtained by the second method for correcting it in a direction to enlarge the area of the region, the threshold with which it is less likely to be determined that dirt adheres to the lens includes a threshold that is greater than a usual threshold, while the threshold with which it is more likely to be determined that dirt adheres to the lens includes a threshold that is smaller than a usual threshold. On the other hand, for the second method for correcting the threshold in a such direction to make the area of the region small, the threshold with which it is less likely to be determined that dirt adheres to the lens includes a threshold that is smaller than a typical threshold, while the threshold with which it is more likely to be determined that dirt adheres to the lens includes a threshold that is greater than a typical threshold.

Further, the current weather information may be determined based on the image from the on-vehicle camera 111, determined based on weather information of the current location via the Internet, or inputted by a driver.

When an image from the on-vehicle camera 111 is inputted to the outside recognition system 100, the edge change observation unit 103 calculates the displacement point 701 that corresponds to the finisher observation point 303 based on the inputted image (S4). The calculation of the displacement point 701 is described in detail with reference to FIG. 6.

Then, the edge change observation unit 103 calculates the finisher observation line 703 based on the displacement point 701 calculated in the processing of S4 (S5). The calculation of the finisher observation line 703 is described in detail with reference to FIG. 7. Note that when calculating the score by using the second method, the edge change observation unit 103 executes the displacement point correction process, which is explained with reference to FIGS. 9A and 9B, with respect to the displacement point 701 calculated in the processing of S4, and then calculates the finisher observation line 703.

Next, the edge change observation unit 103 calculates the displacement point 701 that corresponds to the bumper observation point 304 based on the inputted image (S6). The calculation of this displacement point is also described with reference to FIG. 6.

Then, the edge change observation unit 103, based on the displacement point 701 which is calculated in the processing of S4, interpolates the region of the displacement points 701 and calculates the bumper observation line 702 (S7). The calculation of the bumper observation line 702 is described with reference to FIG. 7. Note that when calculating the score by using the second method, the edge change observation unit 103 executes, similarly to S5, the displacement point correction processing, which is explained with reference to FIGS. 9A and 9B, with respect to the displacement point 701 calculated in the processing of S5, and then calculates the bumper observation line 702.

Next, the dirtiness score calculation unit 104 calculates, when the first method is used, the area of the region between the finisher observation line 703 and the finisher reference line 301 as the finisher score value SC1 (1000), and the area of the region between the bumper observation line 702 and the finisher reference line 301 as the bumper score value SC2 (1001) (S8). Further, in the processing of S8, the dirtiness score calculation unit 104 calculates, when the second method is used, the area of the region between the finisher observation line 703 and the bumper observation line 702 as the score value SC (1004). In the present embodiment, the finisher score value SC1 (1000), the bumper score value SC2 (1001), and the score value SC (1004) are calculated.

Next, the dirtiness determination unit 105 determines whether the finisher score value SC1 (1000) obtained by the first method is equal to or greater than the threshold TH1 (1002), and the bumper score value SC2 (1001) obtained by the first method is equal to or greater than the threshold TH2 (1003) (S9A).

In the processing by the S9A, when at least one of a condition that the finisher score value SC1 (1000) is equal to or greater than the threshold TH1 (1002) and a condition that the bumper score value SC2 (1001) is equal to or greater than the threshold TH1 (1003) is satisfied, it may be determined that the score value by the first method is equal to or greater than the threshold and dirts adheres to the lens of the on-vehicle camera 111; and when both of a condition that the finisher score value SC1 (1000) is equal to or greater than the threshold TH1 (1002) and a condition the bumper score value SC2 (1001) being equal to or greater than the threshold TH1 (1003) are satisfied, it may be determined that the score value by the first method is equal to or greater than the threshold and dirt adheres to the lens of the on-vehicle camera 111.

Also, the dirtiness determination unit 105 determines whether dirt adheres to the lens of the on-vehicle camera 111 by determining whether the score value SC (1004) is equal to or less than the threshold TH (1005) (S9B).

When at least one of the processing in S9A and the processing in S9B determines that dirt adheres to the lens of the on-vehicle camera 111, the dirtiness determination unit 105 determines that dirt adheres to the lens of the on-vehicle camera 111 (S10) and outputs the result of the determination to the dirtiness diagnosis unit 108.

When the result of the determination that dirt adheres to the lens of the on-vehicle camera 111 is inputted to the dirtiness diagnosis unit 108, the dirtiness diagnosis unit 108 outputs to the surroundings recognition unit 107 FAIL information instructing it to suspend its operation (S11) and outputs to the driver notification unit 109 dirtiness notification information in order to notify a driver that the operation of the surroundings recognition unit 107 has been suspended since dirt adheres to the lens of the on-vehicle camera 111 (S12). Note that, when having received the dirtiness notification information, the driver notification unit 109 notifies the driver. As for the mode of the notification, a display screen installed in the vehicle may show the notification, or a speaker installed in the vehicle may output voice expressing the notification.

Next, the outside recognition system 100 determines whether to end the processing by determining whether the ignition is turned OFF (S15). When it is determined in the processing of S15 that the ignition is turned OFF, the processing ends. When it is determined that the ignition is not turned OFF, the processing returns to S3.

On the other hand, when it is determined in the processing of S9A and in the processing of S9B that no dirt adheres to the lens of the on-vehicle camera 111, the dirtiness determination unit 105 determines that no dirt adheres to the lens of the on-vehicle camera 111 (S13) and outputs the result of the determination to the dirtiness diagnosis unit 108.

When the determination result indicating that no dirt adheres to the lens of the on-vehicle camera 111 is inputted to the dirtiness diagnosis unit 108, the dirtiness diagnosis unit 108, without outputting the FAIL information to the surroundings recognition unit 107, allows the surroundings recognition unit 107 to continue with its operation (S14) and moves to the processing of S15.

Accordingly, it becomes possible to determine whether dirt adheres to the lens of the on-vehicle camera 111.

Note that when it is determined that dirt adheres to the lens of the on-vehicle camera 111 in at least one of the processing of S9A and the processing of S9B, the processing moves to the processing of S10 and the dirtiness determination unit 105 determines that dirt adheres to the lens of the on-vehicle camera 111, but when it is determined that dirt adheres to the lens of the on-vehicle camera 111 in the processing of S9A and in the processing of S9B, the processing may move to the processing of S10. Further, considering the fact as described with reference to FIG. 8 that the area of the region calculated by using the second method tends to be larger than the area of the region calculated by using the first method, and also the margin for the threshold tends to larger. Therefore, the processing may move to the processing of S10 when it is determined, at least in the processing of S9B, that dirt adheres to the lens of the on-vehicle camera 111 for the accuracy of the determination of whether dirt adheres to the lens of the on-vehicle camera 111.

Also, in the processing of S9A, it may be determined that dirt adheres to the lens of the on-vehicle camera 111 when the sum of the finisher score value SC1 (1000) and the bumper score value SC2 (1001) is equal to or greater than the threshold.

Further, although the above description calculates the score value with the first method and the score value with the second method, only one of the score values may be calculated. In such case, when the score value is calculated by the first method, there is no need to calculate both the finisher score value SC1 (1000) and the bumper score value SC2 (1001); only one of the score values may be calculated. When only the finisher score value SC1 (1000) is calculated, there is no need to set the bumper observation point 304 in the processing of S2, and there is no need to execute the processing of S6 and S7. Also, when only the bumper score value SC2 (1001) is calculated, there is no need to set the finisher observation point 303 in the processing of S2, and there is no need to execute the processing of S4 and S5.

As described above, according to the present embodiment the outside recognition system 100 calculates the amount by which the observation line is displaced from the reference line and determines whether dirt adheres to the lens of the on-vehicle camera 111 based on the calculated displacement amount. Compared to JP 2007-228448 A in which dirt or the like at a non-edge observation point is not taken account in the value measured by the observation, the present embodiment is operable to detect dirt on the lens of 111 more accurately.

Also, the outside recognition system 100 may calculate, as described with reference to FIG. 8A, the amount by which the observation line is displaced from the reference line by calculating the area of the region between the observation line and the reference line by using the first method, or as described with reference to FIG. 8B, the amount by which each observation line is displaced from each reference line by calculating the area of the region between the first observation line (finisher observation line 703) and the second observation line (bumper observation line 702) by using the second method. Accordingly, it becomes possible to accurately detect dirt on the lens of the on-vehicle camera 111 since the present embodiment calculates the entire amount by which the observation line is displaced from the reference line by using the area of the region.

Further, when using the second method, since the outside recognition system 100 corrects, as described with reference to FIGS. 9A and 9B, the direction of displacement of the displacement point corresponding to the observation point on the first reference line (finisher reference line 301) and the direction of displacement of the displacement point corresponding to the observation point on the second reference line (bumper reference line 302) in a such direction that makes the area greater or smaller in a unified manner, it is operable to prevent displacement points having different direction of displacement from offsetting one another and to prevent the situation where dirt on the lens of the on-vehicle camera 111 cannot be detected.

Further, since the outside recognition system 100 calculates, as described with reference to FIG. 7, the observation line by interpolating the space between each displacement point by using the least squares method, or the like, it is possible to accurately calculate the displacement of the reference line of the region where there is no observation point.

Further, as described with reference to FIG. 6, the outside recognition system 100 acquires the luminance value of pixel of the pixel acquisition range 501 of the observation point set on the reference line, and calculates the pixel whose gradient of the luminance value is the largest as the displacement point. By this, it becomes possible to accurately calculate a point that corresponds to the observation in the image from the on-vehicle camera 111 as the displacement point.

Further, as described with reference to FIG. 3, since the outside recognition system 100 sets the reference line based on design information on the shape of the vehicle, information on the installation position of the on-vehicle camera 111, and the parameter information on the on-vehicle camera 111, it becomes possible to accurately set the position of an object which will be the reference line object on the image from the on-vehicle camera 111.

Embodiment 2

The present embodiment is described above with reference to FIG. 13. For the present embodiment, a vehicle 10 in which the outside recognition system 100 according to embodiment 1 is installed is described below.

Figure 13:
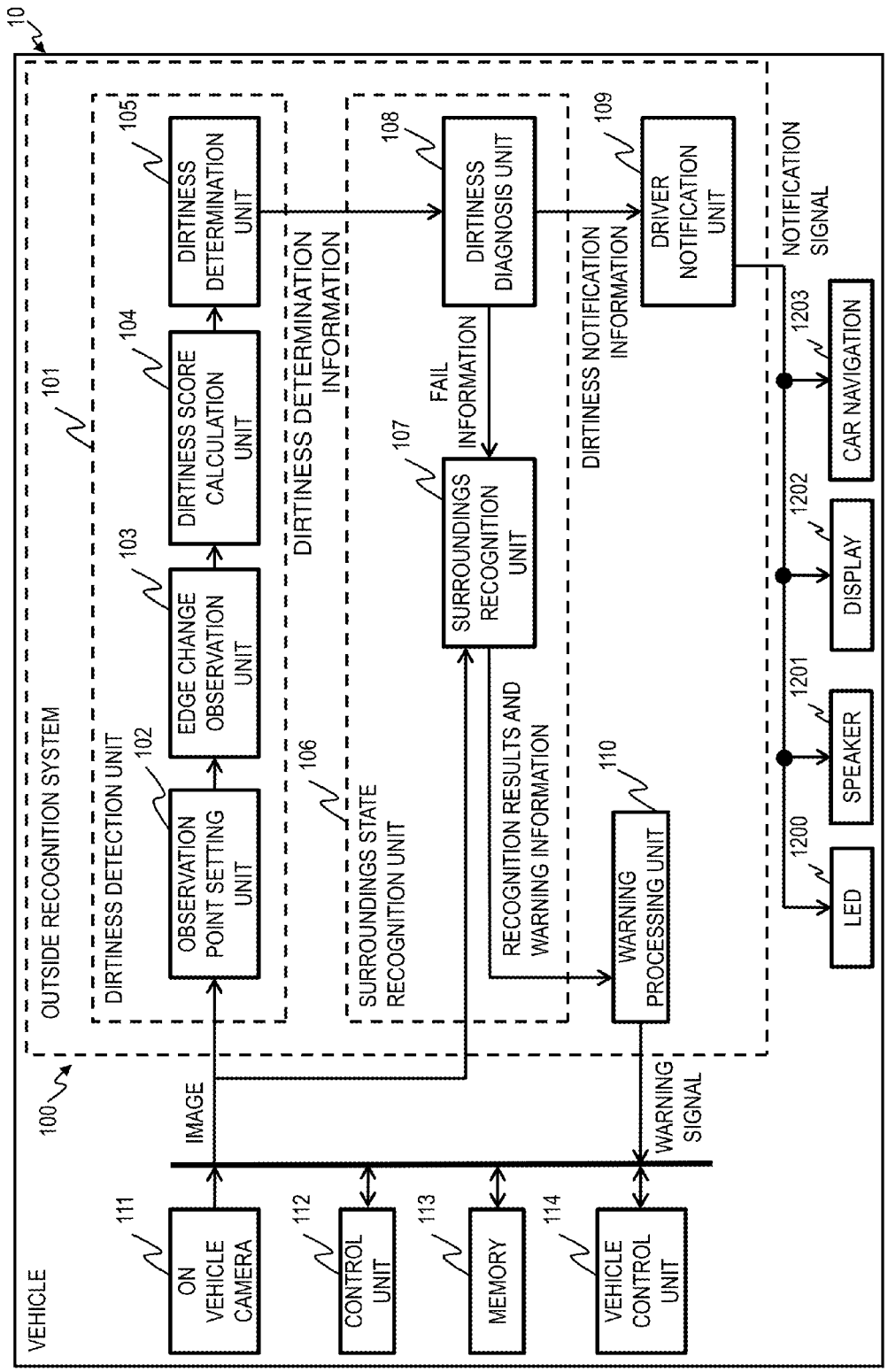
FIG. 13 is an explanatory diagram depicting a vehicle installed therein an outside recognition system according to embodiment 2.

FIG. 13 is an explanatory diagram depicting the vehicle 10 installed therein an outside recognition system 100 according to embodiment 2. Note that the elements illustrated in FIG. 13 having the same configuration as those illustrated in FIG. 1 is denoted with the same reference numerals as those in FIG. 1, and detailed description thereof is omitted.

The vehicle 10 includes the on-vehicle camera 111, the control unit 112, the memory 113, the vehicle control unit 114, an LED 1200, a speaker 1201, a display 1202 and a car navigation (navigation apparatus) 1203.

The driver notification unit 109 outputs, to at least one of the LED 1200, the speaker 1201, the display 1202 and the car navigation 1203, a notification signal in order to notify a driver, when dirtiness notification information is inputted from the dirtiness diagnosis unit 108, that dirt adheres to the lens of the on-vehicle camera 111 and the recognition processing of the surroundings recognition unit 107 is suspended.

When the LED 1200 receives the notification signal, the LED 1200 is turned on to notify the driver that dirt adheres to the lens of the on-vehicle camera 111 and the recognition processing of the surroundings recognition unit 107 is suspended. The LED 1200 may be installed outside or inside the vehicle 10.

When the speaker 1201 received the notification signal, voice information to the driver which indicates that dirt adheres to the lens of the on-vehicle camera 111 and the recognition processing of the surroundings recognition unit 107 is suspended is outputted.

When the display 1202 received the notification signal, the display 1202 displays a message to the driver which indicates that dirt adheres to the lens of the on-vehicle camera 111 and the recognition processing of the surroundings recognition unit 107 is suspended.

When the car navigation 1203 received the notification signal, the car navigation 1203 displays a message to the driver which indicates that dirt adheres to the lens of the on-vehicle camera 111 and the recognition processing of the surroundings recognition unit 107 is suspended.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. An outside recognition system configured to analyze an image from a camera installed on a vehicle, the outside recognition system comprising:
    a processor configured to;
    detect whether dirt adheres to the camera,
    determine a first reference line on a first part of the vehicle and a second reference line on a second part of the vehicle,
    calculate a first observation line that corresponds to the first reference line with the image from the camera,
    calculate a second observation line that corresponds to the second reference line with the image from the camera,
    calculate an area between the first observation line and the second observation line, detect that dirt adheres to the camera when the calculated area between the first observation line and the second observation line is less than a predetermined threshold value, determine a plurality of first observation points on the first reference line and a plurality of second observation points on the second reference line, determine a plurality of first displacement points corresponding to the plurality of first observation points and a plurality of second displacement points corresponding to the plurality of second observation points in the image from the camera, when directions of displacement of the first displacement points corresponding to the plurality of first observation points on the first reference line are different, unify all of the directions of displacement of the first displacement points to be the same, and correct the first displacement points corresponding to the plurality of first observation points on the first reference line based on the unified directions thereof, and when directions of displacement of the second displacement points corresponding to the plurality of second observation points on the second reference line are different, unify all of the directions of displacement of the second displacement points to be the same, and correct the second displacement points corresponding to the plurality of second observation points on the second reference line based on the unified directions thereof, wherein the corrected first displacements points correspond to the first observation line, and wherein the corrected second displacements points correspond to the second observation line.

2. The outside recognition system according to claim 1, wherein the dirt is raindrops or snow adhered to the camera.

3. The outside recognition system according to claim 1, wherein the processor is further configured to:

calculate the first observation line by interpolation of the corrected first observation points, and calculate the second observation line by interpolation of the corrected second observation points.

4. The outside recognition system according to claim 1, wherein the processor is further configured to:

determine a plurality of first observation points on the first reference line and a plurality of second observation points on the second reference line, determine a plurality of first displacement points corresponding to the plurality of first observation points and a plurality of second displacement points corresponding to the plurality of second observation points in the image from the camera, calculate the first observation line by interpolation of the first observation points, and calculate the second observation line by interpolation of the second observation points.

5. The outside recognition system according to claim 4, wherein the processor is further configured to:

acquire a plurality of first luminance values of a plurality of first pixels corresponding to the first observation points in a direction that is orthogonal to the first reference line, determine the first displacement points as the first pixels having a largest gradient of the first luminance values, acquire a plurality of luminance second values of a plurality of second pixels corresponding to the second observation points in a direction that is orthogonal to the second reference line, determine the second displacement points as the second pixels having a largest gradient of the second luminance values.

6. The outside recognition system according to claim 1, wherein the first reference line is a line on a part of a body of the vehicle, and the second reference line is a line on a part of a bumper of the vehicle.

7. The outside recognition system according to claim 1, wherein the processor is further configured to:

when the dirt is detected to adhere to the camera, suspend an operation to recognize surroundings of the vehicle based on analysis result of the image from the camera, and notify a driver of the vehicle of that the dirt is detected to adhere to the camera.

8. A vehicle including the outside recognition system according to claim 1.

9. A dirtiness detection method of a camera installed in a vehicle which analyzes an image from the camera, the method comprising:

determining a first reference line on a first part of the vehicle and a second reference line on a second part of the vehicle, calculating a first observation line that corresponds to the first reference line with the image from the camera, calculating a second observation line that corresponds to the second reference line with the image from the camera, calculating an area between the first observation line and the second observation line, detecting that dirt adheres to the camera when the calculated area between the first observation line and the second observation line is less than a predetermined threshold value, determining a plurality of first observation points on the first reference line and a plurality of second observation points on the second reference line, determining a plurality of first displacement points corresponding to the plurality of first observation points and a plurality of second displacement points corresponding to the plurality of second observation points in the image from the camera, when directions of displacement of the first displacement points corresponding to the plurality of first observation points on the first reference line are different, unifying all of the directions of displacement of the first displacement points to be the same, and correct the first displacement points corresponding to the plurality of first observation points on the first reference line based on the unified directions thereof, and when directions of displacement of the second displacement points corresponding to the plurality of second observation points on the second reference line are different, unifying all of the directions of displacement of the second displacement points to be the same, and correct the second displacement points corresponding to the plurality of second observation points on the second reference line based on the unified directions thereof, wherein the corrected first displacements points correspond to the first observation line, and wherein the corrected second displacements points correspond to the second observation line.

10. The dirtiness detection method according to claim 9, wherein the dirt is raindrops or snow adhered to the camera.

11. A dirtiness detection method of a camera installed in a vehicle which analyzes an image from the camera, the method comprising:

determining a first reference line on a first part of the vehicle and a second reference line on a second part of the vehicle, calculating a first observation line that corresponds to the first reference line with the image from the camera, calculating a second observation line that corresponds to the second reference line with the image from the camera, calculating an area between the first observation line and the second observation line, detecting that dirt adheres to the camera when the calculated area between the first observation line and the second observation line is less than a predetermined threshold value, determining a plurality of first observation points on the first reference line and a plurality of second observation points on the second reference line, determining a plurality of first displacement points corresponding to the plurality of first observation points and a plurality of second displacement points corresponding to the plurality of second observation points in the image from the camera, calculating the first observation line by interpolation of the first observation points, calculating the second observation line by interpolation of the second observation points, acquiring a plurality of first luminance values of a plurality of first pixels corresponding to the first observation points in a direction that is orthogonal to the first reference line, determining the first displacement points as the first pixels having a largest gradient of the first luminance values, acquiring a plurality of luminance second values of a plurality of second pixels corresponding to the second observation points in a direction that is orthogonal to the second reference line, and determining the second displacement points as the second pixels having a largest gradient of the second luminance values.

* * * * *